United States Patent
Feng et al.

(10) Patent No.: US 12,468,858 B2
(45) Date of Patent: Nov. 11, 2025

(54) KEY MANAGEMENT METHOD, KEY MANAGEMENT DEVICE, AND COMPUTING DEVICE

(71) Applicant: Phytium Technology Co., Ltd., Tianjin (CN)

(72) Inventors: Yanzhao Feng, Tianjin (CN); Yufeng Guo, Tianjin (CN); Ming Zhang, Tianjin (CN); Qingshan Zhu, Tianjin (CN); Zhuo Ma, Tianjin (CN)

(73) Assignee: PHYTIUM TECHNOLOGY CO., LTD., Tianjin (CN)

( * ) Notice: Subject to any disclaimer, the term of this patent is extended or adjusted under 35 U.S.C. 154(b) by 258 days.

(21) Appl. No.: 17/993,305

(22) Filed: Nov. 23, 2022

(65) Prior Publication Data
US 2023/0161918 A1    May 25, 2023

(30) Foreign Application Priority Data
Nov. 24, 2021   (CN) .......................... 202111398407.0

(51) Int. Cl.
*G06F 21/71* (2013.01)
*G06F 21/53* (2013.01)

(52) U.S. Cl.
CPC .............. *G06F 21/71* (2013.01); *G06F 21/53* (2013.01)

(58) Field of Classification Search
None
See application file for complete search history.

(56) References Cited

U.S. PATENT DOCUMENTS

| | | | | |
|---|---|---|---|---|
| 4,386,233 A | * | 5/1983 | Smid | H04L 9/3247 713/180 |
| 11,556,482 B1 | * | 1/2023 | Hunt | G06F 12/1045 |
| 2011/0016330 A1 | * | 1/2011 | Asakura | H04L 9/0894 713/189 |
| 2018/0191691 A1 | * | 7/2018 | Smith, III | H04L 9/3268 |
| 2020/0119904 A1 | * | 4/2020 | Philyaw | H04L 63/105 |

(Continued)

FOREIGN PATENT DOCUMENTS

| CN | 1631000 A | 6/2005 |
|---|---|---|
| CN | 101159556 A | 4/2008 |
| CN | 108718233 A | 10/2018 |

(Continued)

*Primary Examiner* — Raqiul A Choudhury
(74) *Attorney, Agent, or Firm* — ANOVA LAW GROUP, PLLC

(57) ABSTRACT

A security architecture method suitable for a security architecture system is provided. The security architecture system includes a first execution environment subsystem and a secure element subsystem. The secure element subsystem is configured to store a key. A hardware isolation mechanism is arranged between the secure element subsystem and the first execution environment subsystem. The method includes: obtaining a key derivation request from the first execution environment subsystem, the key derivation request carrying key identifier information; and allowing a derived key to be generated by using the key corresponding to the key identifier information in response to the first execution environment subsystem have an access authority to access the key corresponding to the key identifier information. The derived key is used to perform a cryptographic operation.

7 Claims, 8 Drawing Sheets

(56) References Cited

U.S. PATENT DOCUMENTS

2021/0185095 A1* 6/2021 Harel .................... H04L 9/0894

FOREIGN PATENT DOCUMENTS

| | | |
|---|---|---|
| CN | 109450620 A | 3/2019 |
| CN | 109960903 A | 7/2019 |
| CN | 110543764 A | 12/2019 |
| CN | 110909391 A | 3/2020 |
| CN | 112258170 A | 1/2021 |
| CN | 112887273 A | 6/2021 |
| CN | 113312676 A | 8/2021 |
| CN | 113449346 A | 9/2021 |
| EP | 3520363 A1 | 8/2019 |
| JP | 2015185113 A | 10/2015 |

* cited by examiner

KEY MANAGEMENT METHOD, KEY MANAGEMENT DEVICE, AND COMPUTING DEVICE

CROSS-REFERENCE TO RELATED APPLICATION

This application claims priority to Chinese Application No. 202111398407.0, filed on Nov. 24, 2021, the entire content of which is incorporated herein by reference.

TECHNICAL FIELD

The present disclosure is related to the technical field of processors and, more specifically, to a key management method, a key management device, and a computing device.

BACKGROUND

With the increasing demand for security, security technologies are gradually applied to various computing devices. In particular, security chip technology has become an important part of the security architecture system in computing devices. The security architecture system of the computing device can include a secure element (SE) subsystem, which is used to build a secure computing environment. Generally, important resources such as root keys and other information are stored in the SE subsystem. During the use of these important resources, security threats such as attacks or malicious access may occur, resulting in information leakage. Therefore, there is a need for a key management method to further ensure the security of important resources stored in the SE subsystem.

SUMMARY

In accordance with the disclosure, embodiments of this application provide a key management method suitable for a security architecture system. The security architecture system includes a first execution environment subsystem and a secure element subsystem. The secure element subsystem is configured to store a key, and a hardware isolation mechanism is arranged between the secure element subsystem and the first execution environment subsystem. The method includes obtaining, by the secure element subsystem, a key derivation request from the first execution environment subsystem, the key derivation request carrying key identifier information; and allowing, by the secure element subsystem, a derived key to be generated by using the key corresponding to the key identifier information in response to the first execution environment subsystem have an access authority to access the key corresponding to the key identifier information. The derived key is used to perform a cryptographic operation.

Further in accordance with the disclosure, embodiments of this application provide a key management device having a memory and a processor. The key management device includes a security architecture system. The security architecture system includes a first execution environment subsystem and a secure element subsystem. The secure element subsystem is configured to store a key in the memory, and a hardware isolation mechanism is arranged between the secure element subsystem and the first execution environment subsystem. The processor is configured to obtain a key derivation request from the first execution environment subsystem, the key derivation request carrying key identifier information; and allow a derived key to be generated by using the key corresponding to the key identifier information in response to the first execution environment subsystem have an access authority to access the key corresponding to the key identifier information. The derived key is used to perform a cryptographic operation.

Further in accordance with the disclosure, embodiments of this application provide a computing device including a security architecture system. The security architecture system includes a first execution environment subsystem and a secure element subsystem. The secure element subsystem is configured to store a key, and a hardware isolation mechanism is arranged between the secure element subsystem and the first execution environment subsystem. The secure element subsystem is configured to obtain a key derivation request from the first execution environment subsystem, the key derivation request carrying key identifier information; and in response to the first execution environment subsystem having an access authority to the key corresponding to the key identifier information, allow use of the key corresponding to the key identifier information to generate a derived key. The derived key is used to perform a cryptographic operation.

BRIEF DESCRIPTION OF THE DRAWINGS

To clearly illustrate the technical solutions in the embodiments of the present disclosure, the drawings used in the description of the embodiments will be briefly described below. It is obvious that the drawings in the following description are only some embodiments of the present disclosure. For those having ordinary skills in the art, other drawings can be obtained according to these drawings without inventive efforts.

DETAILED DESCRIPTION OF THE EMBODIMENTS

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

As used herein, the singular forms "a," "an," and "the" may be intended to include the plural forms as well, unless the context clearly indicates otherwise. Terms such as "first" and "second" used in the present disclosure do not indicate any sequence, quantity or importance, but they are just used to distinguish different components. Also, terms such as "include" and "comprise" mean that an element or an object appearing prior to the word covers an element or an object or its equivalent listed subsequent to the word, but does not exclude other elements or objects. Terms such as "connect" and "connected to" are not limited to physical or mechanical connection, but can comprise electrical connection, regardless of direct connection or indirect connection, such as by using various connected interfaces and lines to achieve information exchange.

With the increasing security requirements of computing devices, more and more security technologies are being applied to various computing devices. Secure management of resources such as keys is critical in any security architecture system. If there are loopholes in the security management of resources, the security environment of the device may become very fragile, and important resources, such as payment related data, can easily leak due to external attacks. In addition, cryptographic technology has become an important part of the security architecture system. Cryptography has a variety of uses and is a critical part of many security architecture systems. For example, security architecture systems can use cryptographic techniques to prevent attackers from gaining access to important data, forging identities, or tampering with documents.

Figure 1:
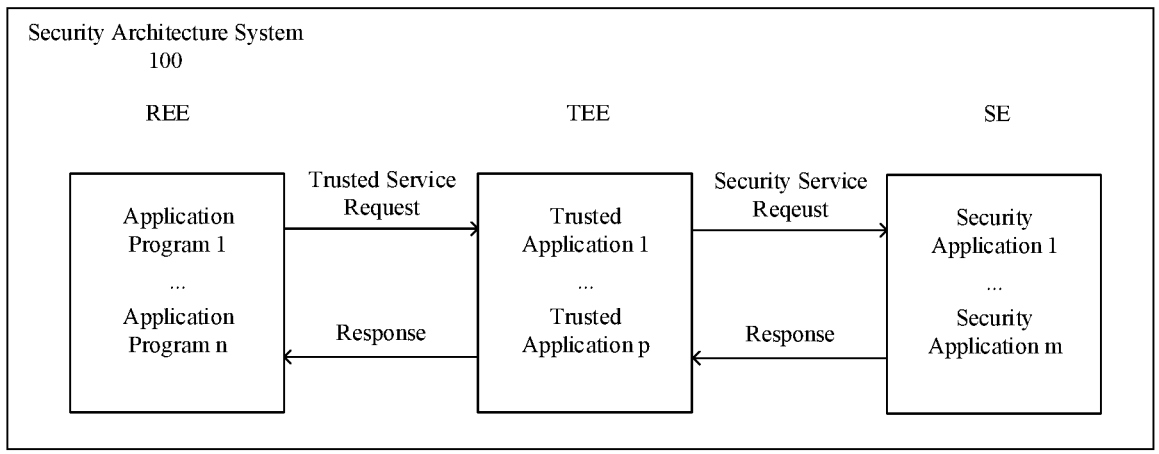
FIG. 1 is a schematic block diagram of a security architecture system with respect to the subsystems.

The security architecture system of a computing device may have three types of subsystems, namely, a rich execution environment (REE) subsystem, a trusted execution environment (TEE) subsystem, and a security element (SE) subsystem. FIG. 1 is a schematic block diagram of a security architecture system with respect to the subsystems. The application running in the REE subsystem can be referred to as a client application (CA), which has low security and is vulnerable to attacks. The application running in the TEE subsystem can be referred to as a trusted application (TA), and its security is higher than the security of the REE, to support functions such as verifying the payment environment in the payment process. The application running in the SE subsystem can be referred to as a secure element application (Applet), and its security is the highest among these three types of subsystems. The system security can be ensured through the cooperation between these three types of subsystems.

Since the SE subsystem has the highest security compared to the REE subsystem and the TEE subsystem, the SE subsystem is generally used to store important resources such as the root key and other information. During the use of these important resources, security threats such as attacks or malicious access may occur, resulting in information leakage. Therefore, there is a need for a key management method to further ensure the security of important resources stored in the SE subsystem.

Based on this, some embodiments of the present disclosure provide a key management method to improving the security of resources stored in the SE subsystem and reduce the risk of leakage of important information such as the root key. More specifically, in the key management method provided by some embodiments of the present disclosure, for a key stored in the SE subsystem, key derivation can be performed based on the key. The derived key derived through the derivation can be used for processes such as cryptographic operations to ensure the security of the stored keys and avoid the risk of root key leakage. Accordingly, the security performance of the security architecture system is further improved. In addition, since the firmware of the SE subsystem has limited functions and is generally developed by a single chip manufacturer, the risk of vulnerabilities can be extremely low. Therefore, this solution can effectively protect the security of the root key.

In the key management method provided by the embodiments of the present disclosure, the key stored in the SE subsystem itself may not be directly used in a specific process. Instead, a derived key may be used to replace the key stored in the SE subsystem for use and management, thereby ensuring the security of important resources such as the root key, and further reducing the risk of the stored key being compromised. For example, for the same batch or even the same series of chips, the root key may be the same, and the frequent use of the root key makes it vulnerable to leakage (such as during a physical attack). If the root key is leaked, the same batch or series of products can have security risks. Embodiments of the present disclosure propose the use of the derived key instead of the root key for processes. In the case where the derived key is leaked during use, the scope of security impact can be limited to a certain application or scenario. In addition, a new derived key can be generated based on the root key. Accordingly, the leakage of the derived key does not affect the security of the entire system, thereby ensuring the security and stability of the security architecture system.

In order to describe the technical solutions of the key management method according to some embodiments of the present disclosure more clearly, the subsystem structure of the security architecture system will be briefly described below with reference to FIG. 1. FIG. 1 is a schematic diagram of a security architecture system including a plurality of subsystems in the related art. The subsystems include the REE subsystem, the TEE subsystem, and the SE subsystem, and the three subsystems may also be referred to as three application environments. It should be understood that the application scenarios of the key management method described above is not limited to the scenario shown in FIG. 1. In some embodiments, the security architecture system may include only one of the REE subsystem and the TEE subsystem. In other embodiments, the REE subsystem and the TEE subsystem may be implemented as a whole as a subsystem, which is not limited in the embodiments of the present disclosure.

More specifically, the REE subsystem may include a general operating system running on a general-purpose embedded processor, in which application programs, such as application program 1 to application program n, where n is a positive integer, shown in FIG. 1, are installed. In some embodiments, an application program may be a program involving payment scenarios, in which basic services such as browsing items, selecting items, submitting order, etc. are implemented. Although many security measures such as device access control, device data encryption mechanism, application runtime isolation mechanism, and permission verification-based access control are adopted in the REE subsystem, the security of important data in applications cannot be ensured.

The TEE subsystem may be an independent operating environment running outside the general operating system, which can provide trusted service such as the REE subsystem and be isolated from the REE subsystem. That is, the REE subsystem and the applications thereon cannot directly access the hardware and software resources of the TEE subsystem. Trusted applications, such as trusted applications 1 to trusted application p, where p is a positive integer, shown in FIG. 1, may be executed in the TEE subsystem to provide a trusted operating environment for the REE subsystem through the trusted applications, and ensure end-to-end security through the protection of confidentiality and integrity and the control of data access authority. In addition, the TEE subsystem may run in parallel with the REE subsystem and interact with the REE subsystem through an application programming interface (API).

The TEE subsystem provides a more secure operating environment than the REE subsystem, but cannot provide a secure key storage and key operating environment with hardware-level isolation. Generally, the TEE subsystem can provide many APIs for the REE subsystem, such that the REE subsystem can call the resources of the TEE subsystem. The more APIs the TEE subsystem provides for services, the greater the risk the TEE subsystem faces. It is difficult to ensure that the API itself does not have security risks, such as security vulnerabilities, which can lead to security risks in resources such as keys in the TEE subsystem. Further, a variety of TAs may run on the TEE subsystem, and the TAs are completely dependent on the isolation mechanism provided by the operating system of the TEE subsystem. Without hardware-level isolation, if the TA itself has security vulnerabilities or the TA itself actively accesses the keys or root keys corresponding to other TAs, it can also lead to a greater security risk for sensitive resources such as keys.

A trusted and secure resource storage and computing environment may also be established based on the SE. Generally, the software system in the SE is relatively simple, including fewer hardware components. Therefore, it is easy to establish physical protection and implement security measures, thereby improving the security strength of the SE to serve security systems with higher security requirements. In some embodiments, the security applications, such as security application 1 to security application m, where m is a positive integer, shown in FIG. 1, can be implemented in the SE.

It should be noted that the key management method provided by the embodiments of the present disclosure can be applied to an application environment with high security requirements, such as managing important resources stored in the SE subsystem. In some embodiments, the application related to the important resources stored in the SE subsystem may be a traditional smart card such as a bank card, a bus card, and a USB shield. The security architecture system implementing the key management method described above can provide users with services with higher security.

It can be understood that the key management method provided by some embodiments of the present disclosure can also be applied to other application scenarios that require security management of keys, which are not limited in the embodiments of the present disclosure.

Next, an electronic device that can be configured to implement the key management method provided by some embodiments of the present disclosure will be described below.

The electronic device may be a mobile terminal, a desktop computer, a tablet computer, a personal computer (PC), a personal digital assistant (PDA), a smart watch, a netbook, a wearable electronic device, an augmented reality (AR) device, etc. that can install applications and implement the corresponding application functions. The present disclosure does not limit the specific form of the electronic device.

Figure 2:
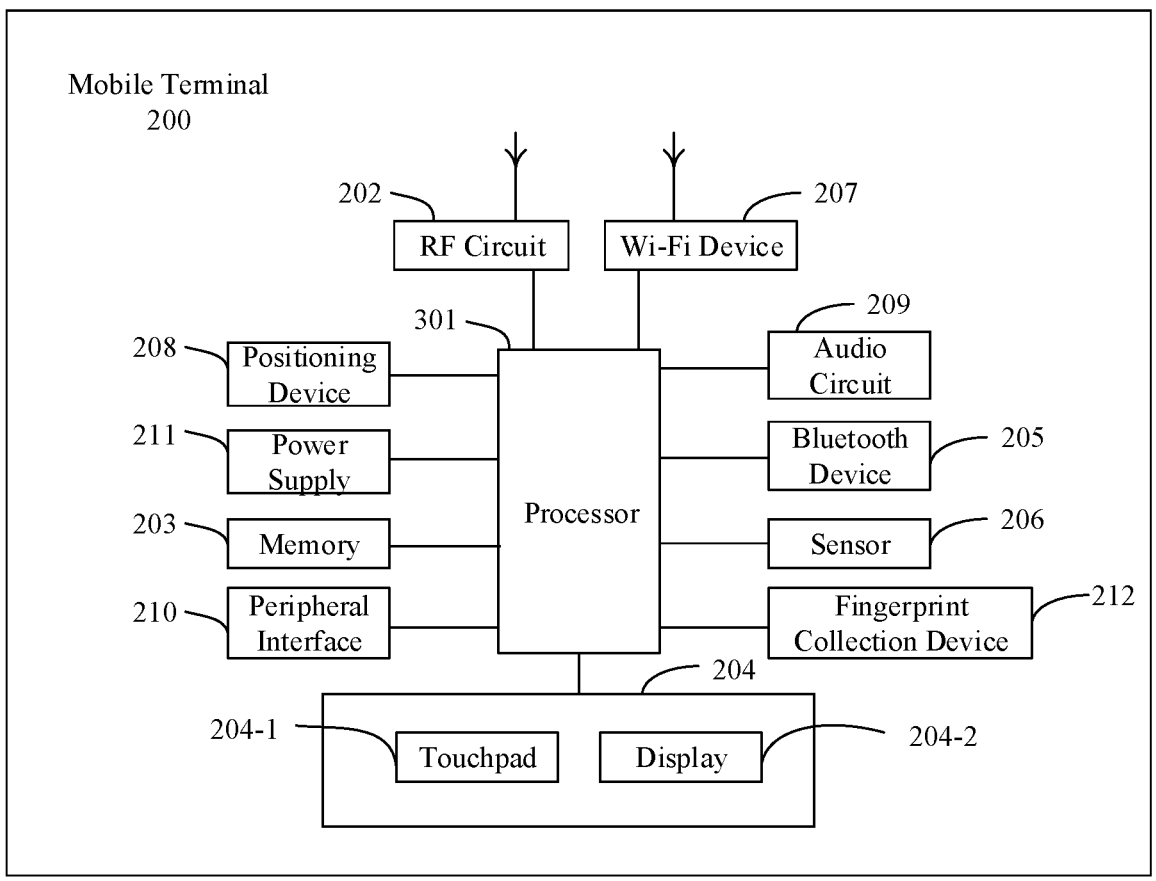
FIG. 2 is a schematic diagram of a terminal device that uses a key management method provided by some embodiments of the present disclosure.

In some embodiments, the security architecture system provided by the embodiments of the present disclosure may be implemented in a mobile terminal 200 as shown in FIG. 2.

As shown in FIG. 2, the mobile terminal 200 includes a processor 201, a radio frequency (RF) circuit 202, a memory 203, a touch display screen 204, a Bluetooth device 205, one or more sensors 206, a wireless fidelity (Wi-Fi) device 207, a positioning device 208, an audio circuit 209, a peripheral interface 210, and a power supply 211. These components may communicate vis one or more communication buses or signal lines. Those skilled in the art can understand that the hardware structure shown in FIG. 2 does not constitute a limitation on the mobile terminal. The mobile terminal 200 may include more or less components, combine some components, or arrange the components differently.

Each component of the mobile terminal 200 will be described in detail below with reference to FIG. 2A.

First, the processor 201 is the control center of the mobile terminal 200. The processor 201 may use various interfaces and lines to connect various parts of the mobile terminal 200. The processor 201 may be configured to execute various functions of the mobile terminal 200 and process data by running or executing the application programs stored in the memory 203 and calling the data stored in the memory 203. In some embodiments, the processor 201 may include one or more processing units. For example, the processor 201 may be various types of processor chips.

The RF circuit 202 may be used to receive and transmit wireless signals in the process of sending and receiving information or calling. In particular, the RF circuit 202 may receive the downlink data of the base station, send the data to the processor 201 processing, and send the data related to the uplink to the base station. Generally, the RF circuit may include, but is not limited to, antennas, at least one amplifier, transceivers, couplers, low noise amplifiers, duplexers, etc. In addition, the RF circuit 202 may also communicate with other devices through wireless communication. The wireless communication may use any communication standard or protocol, including but not limited to, global system for mobile communications, general packet radio service, code division multiple access, wideband code division multiple access, long term evolution, email, short message service, etc.

The memory 203 may be used to store application programs and related data. The processor 201 may be configured to perform various functions and data processing of the mobile terminal 200 by running the application programs and the data stored in the memory 203. The memory 203 may include a program storage area and a data storage area. The program storage area can store an operating system and an application program required for at least one function (e.g., an application program for implementing an online shopping function). The data storage area can store data (e.g., products browsing data, order data, etc.) created based on the user of the mobile terminal 200. In addition, the memory 203 may include a high-speed random-access memory (RAM), and may also include a non-volatile memory, such as a magnetic disk storage device, a flash memory device, or other volatile solid-state storage devices. The memory 203 may store various operating systems. The memory 203 may be independent and connected to the processor 201 through a communication bus. In addition, the memory 203 may also be integrated with the processor 201.

The touch display screen 204 may include a touchpad 204-1 and a display 204-2.

In some embodiments, the touchpad 204-1 may be configured to collect touch operations (which can also be referred to as touch events) on or near the user of the mobile terminal 200, and send the collected touch information to other devices (e.g., the processor 201). For example, the user may use any suitable object such as a finger, a stylus, etc. to perform an operation on or near the touchpad 204-1. A user's touch event near the touchpad 204-1 may be referred to as a hovering touch. The hovering touch may indicate that the user does not need to directly touch the touchpad 204-1 in order to select, move, or drag objects (e.g., icons), but the user only needs to be in the vicinity of the device in order to perform the desired function. In addition, various types of resistive, capacitive, infrared, and surface acoustic waves can be used to implement the touchpad 204-1.

The display (which can also be referred to as a display screen) 204-2 may be used to display information input by the user or information provided to the user, and various menus of the mobile terminal 200. The display 204-2 may be configured in the form of a liquid crystal display, an organic light-emitting diode, etc. The touchpad 204-1 may be overlaid on the display 204-2, and when the touchpad 204-1 detects a touch event on or near the touchpad 204-1, the detected event may be sent to the processor 201 to determine the parameters of the touch event. Subsequently, the processor 201 may provide the corresponding output data, for example, a product list, on the display 204-2 based on the parameters of the touch event. Although in FIG. 2, the touchpad 204-1 and the display 204-2 are used as two independent components to realize the input and output function of the mobile terminal 200, but in some embodiments, the touchpad 204-1 may be integrated with the display 204-2 to realize the input and output functions of the mobile terminal 200. It should be understood that the touch display screen 204 is formed by stacking multiple layers of materials. Only the touch panel (layer) and the display screen (layer) are shown in FIG. 2, and other layers are not described in FIG. 2. In addition, the touchpad 204-1 may be arranged on the front of the mobile terminal 200 in the form of a full panel, and the display 204-2 may also be arranged on the front of the mobile terminal 200, such that a frameless structure can be realized on the front of the terminal device.

Further, the mobile terminal 200 may also include a fingerprint recognition function. For example, a fingerprint collection device 212 may be arranged on the back of the mobile terminal 200 (e.g., under the rear camera), or the fingerprint collection device 212 may be arranged on the front of the mobile terminal 200 (e.g., under the touch display screen 204). In another example, the fingerprint collection device 212 may be arranged in the touch display screen 204 to realize the fingerprint recognition function. That is, the fingerprint collection device 212 may be integrated with the touch display screen 204 to realize the fingerprint recognition function of the mobile terminal 200. In this case, the fingerprint collection device 212 may be arranged in the touch display screen 204, and may be a part of the touch display screen 204 or may be arranged in the touch display screen 204 in other ways. The main component of the fingerprint collection device 212 may be a fingerprint sensor, and the fingerprint sensor may adopt any type of sensing technology, including but not limited to optical, capacitive, piezoelectric, or ultrasonic sensing technologies.

The mobile terminal 200 may further include a Bluetooth device 205 for realizing data exchange between the mobile terminal 200 and other short-range devices (e.g., mobile phones, smart watches, etc.). More specifically, the Bluetooth device 205 may be an integrated circuit or a Bluetooth chip.

The mobile terminal 200 may also include at least one sensor 206, such as an optical sensor, a motion sensor, and other sensors. More specifically, the optical sensor may include an ambient light sensor and a proximity sensor. The ambient light sensor can adjust the brightness of the display of the touch display screen 204 based on the brightness of the ambient light, and the proximity sensor can turn off the power of the display when the mobile terminal 200 is moved to the ear. As a type of motion sensor, an accelerometer sensor can detect the magnitude of acceleration in all directions (generally three axes), detect the magnitude and direction of gravity when it is stationary, and can be used for applications that recognize the attitude of the mobile phone (e.g., horizontal and vertical screen switching, related games, magnetometer attitude calibration), and vibration recognition related functions (e.g., pedometer, tap), etc. The mobile terminal 200 may also be configured with other sensors such as a gyroscope, a barometer, a hygrometer, a thermometer, an infrared sensor, etc., which will not be described in detail here.

The Wi-Fi device 207 can be used to provide the mobile terminal 200 with network access following the Wi-Fi related standard protocol. The mobile terminal 200 may access the Wi-Fi access point through the Wi-Fi device 207, thereby assisting the user to receive and send data, such as sending and receiving emails, browsing the web, and accessing streaming media, etc., which provides the user with wireless broadband Internet access. In other embodiments, the Wi-Fi device 207 may also act as a Wi-Fi wireless access point, and may provide Wi-Fi network access for other devices.

The positioning device 208 may be used to provide the mobile terminal 200 with geographic location information. It should be understood that the positioning device 208 may be a receiver of a positioning system, such as the global positioning system (GPS), the Beidou satellite navigation system, the Russian GLONASS, etc. After receiving the geographic location information sent by the position system, the positioning device 208 may, for example, send the information to the processor 201 for processing, or send the information to the memory 203 for storage. In some embodiments, the positioning device 208 may also be a receiver of an assisted global positioning system (AGPS), and the AGPS may act as an auxiliary server to assist the position device 208 to complete ranging and positioning services. In this case, the assisted positioning server may provide positioning assistance by communicating with a device such as a positioning device 208 (e.g., a GPS receiver) of the mobile terminal 200 over a wireless communication network. In some embodiments, the positioning device 208 may also be a positioning technology based on a Wi-Fi access point. Since each Wi-Fi access point has a globally unique media access control (MAC) address, when the Wi-Fi is turned on, the terminal device may scan and collect the broadcast signals of the surrounding Wi-Fi access points to obtain the MAC addresses broadcast by the Wi-Fi access points. The terminal device may send the data (e.g., the MAC addresses) that can identify the Wi-Fi access points to a location server through the wireless communication server. The location server may retrieve the geographic location of each Wi-Fi access point, and combine the strength of the Wi-Fi broadcast signal to calculate the geographic location of the terminal device and send it to the positioning device 208 of the terminal device.

The audio circuit 209 may be a speaker and a microphone for providing an audio interface between the user and the mobile terminal 200. On one hand, the audio circuit 209 may convert the received audio data into electrical signals, and transmit the electrical signals to the speaker to convert the electrical signals into sound signals for output. On the other hand, the microphone may convert the collected sound signals into electrical signals, which may be received by the audio circuit 209 to converted into audio data. The audio data may be output to the RF circuit 202 for transmission to, for example, another device, or to the memory 203 for further processing.

The peripheral interface 210 may be used to provide various interfaces for external input/output devices (e.g., keyboards, mouses, external displays, external memories, subscriber identification module cards, etc.). For example, a mouse can be connected through a universal serial bus (USB) interface, and a subscriber identification module (SIM) provided by a telecom provider can be through the metal contacts on the card slot of the SIM. The peripheral interface 210 may be used to couple the external input/output peripherals to the processor 201 and the memory 203.

The mobile terminal 200 may also include a power device 211 (such as a battery and a power management chip) for supplying power to various components. The battery may be logically connected to the processor 201 through the power management chip, such that the functions of charging and discharging management and power consumption management can be realized through the power supply 211.

Although not shown in FIG. 2, the mobile terminal 200 may further include a camera (a front camera and/or a rear camera), a flash, a pico-projection device, a near field communication (NFC) device, etc., which will not be described in detail here.

The key management method described in each of the following embodiments can be implemented in the mobile terminal 200 having the hardware structure described above. Nonetheless, it can be understood that the key management method described herein can also be applied to other suitable computing devices, not limited to the mobile terminal described in conjunction with FIG. 2.

Figure 3:
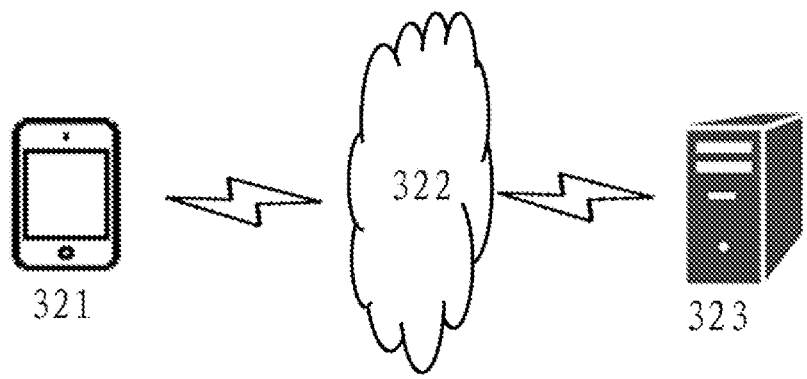
FIG. 3 is a schematic diagram of an application system implementing the key management method provided by some embodiments of the present disclosure.

FIG. 3 is a schematic diagram of an application system implementing the key management method provided by some embodiments of the present disclosure. As shown in FIG. 3, the application system may include a terminal device 321, a network 322, and a server 323.

The terminal device 321 may be the illustrated mobile terminal or a fixed terminal, configured to perform data transmission with the server 323 through the network 322. Various applications may also be installed on the terminal device 321, such as shopping applications, web browsing applications, video playback applications, news applications, etc. In addition, the terminal device 321 may include an input/output device, such that the terminal device 321 can receive user operations, such as receiving the user's touch and gesture operations through the touch display screen, or receiving the user's voice operation through a microphone. Then, the terminal device 321 may generate a request message based on the received operation. Through the network 322, the terminal device 321 may send the request message to the server 323, and receive the data returned by the server 323 in response to the request message. The terminal device 321 may display based on the data returned by the server 323, for example, display the received display data, such as a video or an image, on the display of the terminal device 321. In addition, the received data may also include other information, such as the display time point and the display duration of the video. Alternatively, the server 323 may also directly send the data to the terminal device 321 without receiving the request message, thereby performing a corresponding processing process on the terminal device 321.

The terminal device 321 may be in the form of hardware or software. When the terminal device 321 is in the form of hardware, it can be various devices that have a display and supports programs running thereon. As described above, the terminal device 321 may be the illustrated mobile terminal, such as the mobile terminal having the components described above in conjunction with FIG. 2. As other examples, the terminal device 321 may also be a smart TV, a tablet computer, an e-book reader, a moving picture experts group audio layer IV (MP4) player, a laptop computer, a desktop computer, etc. When the terminal device 321 is in the form of software, it may be installed in the electronic devices listed above, and it may be implemented as a plurality of software or software modules (e.g., software or software modules for providing distributed services), or it may be implemented as a single software or software module, which is not limited in the embodiments of the present disclosure.

The network 322 may be a wired network or a wireless network, which is not limited in the embodiments of the present disclosure. The server 323 may be a server that provides various services, such as receiving the data stream sent by the terminal device 321 and performing buffering. In addition, the server 323 may also receive the request message sent by the terminal device 321, analyze the request message, and send the analysis result (e.g., a data stream corresponding to the request message) to the terminal device 321. Different servers may be arranged based on different application types. For example, the server 323 may be an instant message server, a payment application server, an information display application server, a resource management server, etc. It should be understood that the numbers of terminal device 321, network 322, and server 323 shown in FIG. 3 are only illustrative. Based on the application scenarios, there can be any number of terminal devices, networks, and servers.

Figure 4:
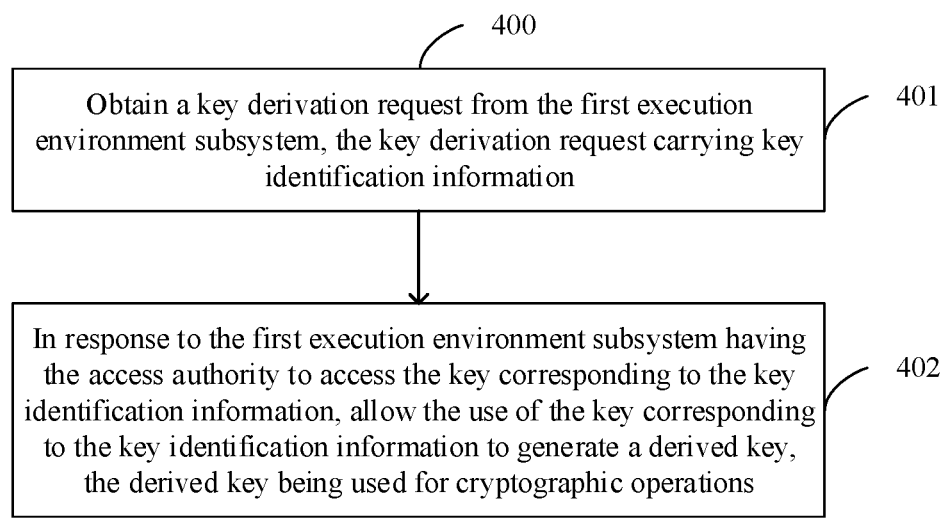
FIG. 4 is a flowchart of the key management method according to some embodiments of the present disclosure.

FIG. 4 is a flowchart of the key management method according to some embodiments of the present disclosure. The specific implementation process of the key management method according to some embodiments of the present disclosure will be described below with reference to FIG. 4.

The key management method according to some embodiments of the present disclosure can be applied to a security architecture system, such as the security architecture system described above in conjunction with FIG. 1. More specifically, the security architecture system according to an embodiment of the present disclosure may include a first execution environment subsystem and a secure element subsystem. In some embodiments, the first execution environment subsystem may include at least one or a REE subsystem and a TEE subsystem. For example, the first execution environment subsystem may include both the REE subsystem and the TEE subsystem. Hereinafter, the key management method provided by some embodiments of the present disclosure will be described in detail by taking the implementation of resource management in a security architecture system (as shown in FIG. 1) including the three types of subsystems described above as an example. It should be understood that the application scenarios of the key management method according to some embodiments of the present disclosure are not limited thereto.

According to some embodiments of the present disclosure, there may be a hardware isolation mechanism between the secure element subsystem and the first execution environment subsystem. That is, compared with the REE subsystem and the TEE subsystem, the SE subsystem may provide hardware-level isolation key storage and key operating environment. For example, by means of access control, the SE subsystem may isolate important resources such as root keys stored in it from other less secure subsystems such as the REE subsystem and the TEE subsystem in hardware to ensure that under normal implementation of application functions, the subsystems are isolated in hardware. Accordingly, while ensuring the normal implementation of application functions, the use of resources such as the root key can be controlled, thereby avoiding resource leakage during the use of the root key (e.g., payment verification based on the root key etc.). In some embodiments, the hardware isolation mechanism may be expressed as other subsystems in the security architecture system that do not have the access paths to directly access the resources stored in the SE subsystem.

According to some embodiments of the present disclosure a key can be stored in the SE subsystem. In some embodiments, the key may be a root key, such as the root key corresponding to the chip manufacturer, the root key corresponding to the manufacturer of the whole machine, the root key corresponding to the user, and other important information. It should be understood that the root key here is an example of an important resource stored by the SE subsystem, and other important information can also be stored in the SE subsystem. In addition, the term "root key" is not unique, as long as it can be used as a relatively important key or a related term for deriving other keys.

The key management method shown in FIG. 4 will be described in detail below.

401, obtaining a key derivation request from the first execution environment subsystem, the key derivation request carrying key identifier information.

The key derivation request may be used to request the SE subsystem to perform key derivation by using the root key corresponding to the carried key identifier information in the plurality of root keys stored therein.

In addition, key derivation request may also carry parameters associated with the key derivation. For example, the parameters may include the length of the derived key, the rounds of the derived key, etc., thus, the SE subsystem can perform the key derivation process based on the parameters of the key derivation. In addition, it can be understood that the first execution environment subsystem that sends the key derivation request may also carry the parameters related to the key derivation via another request, which is not limited in the embodiments of the present disclosure.

402, in response to the first execution environment subsystem having the access authority to the key corresponding to the key identifier information, allowing the use of the key corresponding to the key identifier information to generate a derived key, the derived key being used for cryptographic operations.

In the process at 402, for the received key derivation request, the SE subsystem may authenticate the key derivation request corresponding to access the first execution environment subsystem to determine whether the request has the access authority to access the key corresponding to the key identifier information, thereby ensuring the security of the key.

For example, if the SE subsystem determines that the key derivation request corresponding to the first execution environment subsystem does not have the access authority, the key derivation request may be rejected or ignored, thereby avoiding unauthorized access to important resources stored in the SE subsystem to ensure the security of the resources. In addition, since there is a hardware isolation mechanism between the SE subsystem and the first execution environment subsystem, the first execution environment subsystem does not have other access paths to the important resource stored in the SE subsystem, thus ensuring the security of the resources in the SE subsystem.

In another example, if the SE subsystem determines that the key derivation request corresponding to the first execution environment subsystem has the access authority, the SE subsystem may perform a corresponding key derivation process based on the information carried in the key derivation request, and generate a derived key. In some embodiments, the generated derived key may be used for cryptographic operations such as encrypting certain data based on the derived key. In other embodiments, the generated derived key may also be used for authentication and other processes, which is not limited in the embodiments of the present disclosure. In the key management method according to some embodiments of the present disclosure, the generated derived key can be used to perform security-related processes. Important information such as the root key may only be used to generate the derived key, thereby avoiding the frequent use of the root key (e.g., the root key stored in the SE subsystem is not used for application scenarios such as cryptographic operations) and ensuring the security of the root key.

As described above, for the derived key generated by the key management method according to some embodiments of the present disclosure, even if the derived key is compromised, the scope of its security impact is limited to a certain application or scenario. Further, after the derived key is leaked, the security architecture system can re-derive a new derived key based on the secured root key, such that the leakage of a derived key does not affect the security of the entire system, which can further improve the security performance of the security architecture system. For example, the device integrating the security architecture system provided by the embodiments of the present disclosure can be applied in various fields, such as mobile payment, secure communication, Internet of Things, cloud computing, and other application scenarios with high security requirements.

According to some embodiments of the present disclosure, the generated derived key may also be associated with a derived key access rule. The key management method according to some embodiments of the present disclosure may further include: in the case of invoking the derived key, determining whether the requester invoking the derived key has the access authority to the derived key based on the derived key access rule.

In some embodiments, after the derived key is generated, the access rule may be stored in the SE domain in association with the generated derived key, such that in the case of a subsequent request to use the derived key again, the authentication can be performed based on the access rule. If the access rule is met, the derived can be allowed to be used, thereby ensuring the security of the derived key in the subsequent process. In some embodiments, the access rule may be a rule associated with the use of the derived key, such as any read, special identification, or authorized process may update or destroy the derived key.

In some embodiments, an example with the access rule can work for scenarios where the derived key is used multiple times. For example, the requester that generates the derived key may also set the access rule while requesting key derivation for subsequent use. In some embodiments, the requester may carry the access rule in the key derivation request.

In the key management method provided by the embodiments of the present disclosure, the requester of the derived key (such as the TEE subsystem) may also provide the access rule for the derived key. Accordingly, other subsequent requesters (such as the TEE subsystem, the REE subsystem, or the SE subsystem) need to perform the authentication process based on the set access rule when using the derived key, thereby avoiding unauthorized requesting parties from using the derived key, and further ensuring the security of the derived key.

For example, the requesting TEE subsystem has the access authority to a root key A, and the TEE subsystem requests the SE subsystem to generate a derived key B based on the root key A. In addition, the TEE also sets a corresponding access rule R for the derived key B. Based on the access rule R, the REE subsystem may be prevented from using the derived key B. That is, based on the access rule R, the access authority of the REE subsystem for the derived key is restricted. In another example, for the derived keys B1 and B2 generated based on the same root key A, different access rules R1 and R2 may be set respectively. For example, due to the difference in the indicated key derivation parameters, the derived keys B1 and B2 generated based on the same root key A may not be the same. The requester of the derived keys B1 and B2 may set different access rules for the generated derived keys to restrict the use of the keys B1 and B2 respectively. For example, access rule R1 for the derived key B1 may indicate that both the TEE subsystem and the REE subsystem have the authority to use key B1 for cryptographic operations, while access R2 for the derived key B2 may indicate that only the TEE subsystem has the authority to use key B2 for cryptographic operations.

According to some embodiments of the present disclosure, a derived key access rule may include multiple sub-access rules, each of which may be used to indicate how the derived key is operated. According to some embodiments of the present disclosure, the key management method may further include: receiving an access request from the first execution environment subsystem, the access request being used to request an operation mode to be performed on the derived key; and, in response to the access authority of the first execution environment subsystem meeting the sub-access rules set for the operation mode required by the access request, performing operations on the derived key based on the operation mode indicated by the access request.

The derived key access rule may be further subdivided based on the operation mode. For example, different sub-access rules may be set for different operation modes. In some embodiments, the sub-access rule corresponding to the usage operation mode may be that both the processes in the TEE subsystem and the REE subsystem can use the derived key. For example, the usage operation may be to use the derived key to perform cryptographic operations. Further, the sub-access rule corresponding to the operation mode other than the usage may be that only the TEE subsystem can perform operation modes other than the usage on the derived key, such as backup, update, or delete the derived key. By setting the sub-access rules described above, multiple sub-access rules can be set up based on specific application requirements and application scenarios, thereby increasing the flexibility of management of the derived key and meeting the needs of different application scenarios.

Next, the implementation process of key management based on the security architecture system in the above embodiment will be described in detail below with reference to the accompanying drawings.

Figure 5:
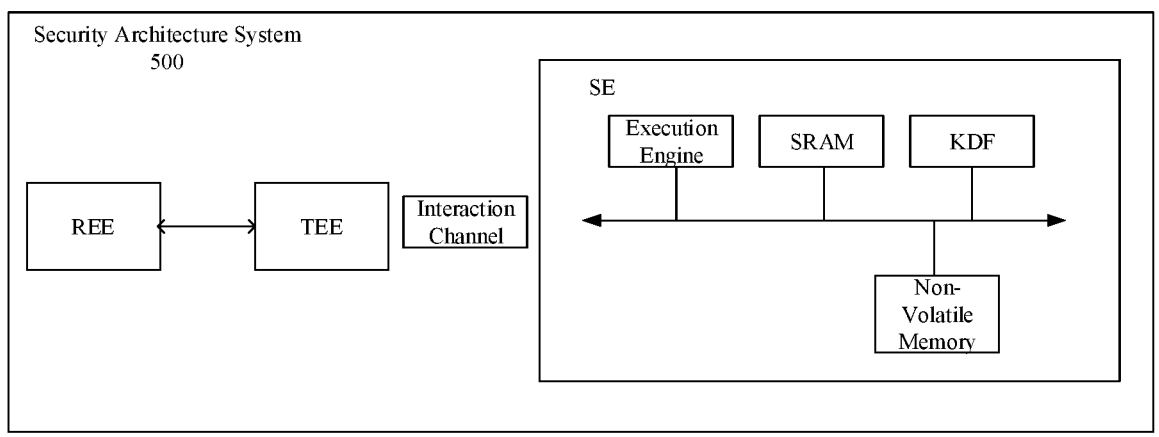
FIG. 5 is schematic block diagram of the security architecture system according to some embodiments of the present disclosure.

FIG. 5 is schematic block diagram of a security architecture system 500 according to some embodiments of the present disclosure. As shown in FIG. 5, the security architecture system 500 includes three subsystems, namely, the REE subsystem, the TEE subsystem, and the SE subsystem, where the REE subsystem and the TEE subsystem can interact, such as sending data and requesting information, with the SE subsystem through an interaction channel. According to some embodiments of the present disclosure, there is a hardware isolation mechanism between the SE subsystem and the REE subsystem and the TEE subsystem. The hardware isolation mechanism can be represented as other subsystems in the security architecture system do not have access paths to directly access the resources stored in the SE subsystem. As shown in FIG. 5, there is no physical path for the REE subsystem and the TEE subsystem to directly access the SE subsystem. The REE subsystem and the TEE subsystem may only make requests to the SE subsystem through interactive methods such as a shared memory, for the SE subsystem to provide the corresponding services to the REE subsystem and the TEE subsystem. That is, there is a hardware isolation mechanism between the SE subsystem and the TEE subsystem or the REE subsystem. Therefore, compared with the REE subsystem and the TEE subsystem, the SE subsystem can provide hardware-level isolation key storage and key operating environment. In some embodiments, the shared memory may be referred to as a large-capacity memory that can be access by different processors in a multi-processor computer system.

In some embodiments, the SE subsystem may include an execution engine, a static random-access memory (SRAM), a non-volatile memory, and a key derivation function (KDF). In some embodiments, important resources such as the root key may be stored in the non-volatile memory within the SE subsystem to ensure the root key does not have a software of hardware path out of the SE subsystem through the SE subsystem's firmware or hardware. In addition, the KDF integrated in the SE may be implemented as software or hardware, and used to generate a derived key based on the root key. For example, the KDF may be a hash function, which is commonly used to turn short passwords into long passwords.

In some embodiments, in the case that the SE subsystem is required to provide relevant security services, the TEE subsystem or the REE subsystem may send a key derivation request to the SE subsystem via the interaction channel. The key derivation request may carry the key identifier information, which can be used to indicate one or more of the plurality of root keys stored in the SE subsystem. In addition, the key derivation request may also carry information such as the derivation parameters associated with the key derivation, the set access rules, etc.

In response to receiving the key derivation request, the SE subsystem may first authenticate the requester of the derivation request to determine whether the requester has the access authority to the corresponding root key. If the SE subsystem determines that the requester has the access authority, the SE subsystem may instruct the KDF module included in the SE subsystem to perform a corresponding key derivation process to generate a derived key. Through the key authentication process realized by the SE subsystem described above, the security of the root key requested for performing the cryptographic operations can be further ensured, and the requester without the access authority cannot perform the corresponding unauthorized calculation based on the root key, thereby increasing the security of the security architecture system.

In the security architecture system according to some embodiments of the present disclosure, the security of the device is not only ensured based on each security-level related subsystems, but also a hardware cryptographic engine. In addition, between each subsystem and the hardware cryptographic engine, the cryptographic engine may be controlled to perform cryptographic operations based on a dedicated access interface, thereby further improving the security of the key and reducing the risk of leakage of important information.

According to some embodiments of the present disclosure, the first execution environment subsystem may not have the access authority to access the hardware cryptographic engine. That is, subsystem such as the TEE subsystem and the REE subsystem may not have the access interface to access the hardware cryptographic engine. Further, the SE subsystem may have the access authority to access the hardware cryptographic engine. That is, the SE subsystem may access the hardware cryptographic engine via the access interface to perform cryptographic operations through the hardware cryptographic engine.

According to some embodiments of the present disclosure, the access authority of each of the subsystems described above to the security architecture system may be controlled based on a dedicated access interface. For example, if the REE does not have the access authority to the hardware cryptographic engine, the REE will not have the access interface to the hardware cryptographic engine, thereby avoiding the risk of information leakage from the hardware cryptographic engine due to an attack on the REE. In addition, the access control of the hardware cryptographic engine may be realized by configuring the access interface, which enables the system to perform cryptographic operations in hardware more flexibly, and the operating performance of cryptographic operations is improved to meet the needs of various application scenarios.

The hardware cryptographic engine according to some embodiments of the present disclosure may be configured to support the required cryptographic operation algorithms. For example, the cryptographic operation algorithms may include symmetric cryptographic algorithms, asymmetric cryptographic algorithms, hash algorithms, etc. The asymmetric cryptographic algorithms are encryption algorithms that use different keys for encryption and decryption.

In some embodiments, the hardware cryptographic engine according to some embodiments of the present disclosure may be designed to implement hardware acceleration of asymmetric encryption algorithms. The two keys used in the asymmetric encryption algorithm are the public key and the private key, and the public key and the private key work in pairs. If the public key (or private key) is used to encrypt the data, only the corresponding private key (or public key) can be used to decrypt the data. Asymmetric encryption is widely used in information encryption, login authentication, digital signature, digital certificate, and other fields. For example, when the first user needs to send information to the second user, the second user's public key is generally used for encryption, After the second user receives the encrypted data, the second user can decrypt the encrypted data with his private key, and only the second user can have the private key. When the first user sends a signature to the second user, the first user can encrypt the signature with his private key, and the second user can verify the signature based on the first user's public key. Signing with a private key means that only the information owner can sign, and it is non-repudiation.

In some embodiments, the hardware cryptographic engine according to some embodiments of the present disclosure may be configured to implement hardware acceleration of symmetric encryption algorithms. A symmetric cryptographic algorithm is an encryption algorithm that uses the same key for encryption and decryption. In a symmetric cryptographic algorithm, the data sender uses a key to encrypt the plaintext and sends the encrypted the plaintext, and the data receiver uses the same key to restore the ciphertext to plaintext after receiving the data. In a symmetric cryptographic algorithm, since the sender and the receiver use the same key to encrypt and decrypt data, the security of the encryption depends not only on the encryption algorithm itself, but also on the security of the key. Encryption and decryption generally do not require key exchange in the same system or in a fixed key environment as long as certain access authorities are set to the key. However, when encryption and decryption are in different systems and do not use a fixed key, it is necessary to exchange keys. The symmetric cryptographic algorithm has the characteristics of fast encryption speed and high encryption efficiency, and is suitable for encryption scenarios with a large amount of data.

In some embodiments, the hardware cryptographic engine according to some embodiments of the present disclosure may be designed to implement hardware acceleration of hash algorithms. A hash algorithm, also known as hashing, employs a function that transforms an input message string of arbitrary length into an output string of fixed length. The hash algorithm's process of generating the hash value is unidirectional, the reverse operation is difficult to complete, and the probability of collision (two different inputs producing the same hash value) is very low. Hash algorithm plays an important role in modern cryptography. In the hash algorithm, the same ciphertext can only be obtained by entering the same plaintext, which is generally used in fields such as data integrity verification, identity authentication, digital signatures, key derivation, message authentication codes, etc.

In addition, the hardware cryptographic engine according to some embodiments of the present disclosure may be designed to implement true random number generation. In cryptosystems, the keys in symmetric encryption algorithms, and the prime numbers and the keys in asymmetric encryption algorithms all require random numbers. Therefore, the hardware cryptographic engine may be configured such that it has dedicated source of physical randomness to generate the required random numbers.

It should be understood that, the hardware cryptographic engine according to some embodiments of the present disclosure may have one or more of the various encryption algorithms described above, and may also be used to implement other encryption algorithms or function, which are not limited in the embodiments of the present disclosure.

In the above embodiment, neither the first execution environment subsystem such as the REE subsystem and the TEE subsystem have the access authority to access the hardware cryptographic engine. In the case that the REE subsystem and the TEE subsystem require cryptographic operations, the hardware cryptographic engine may be controlled to perform the corresponding processing by requesting the SE subsystem with the access authority. Through the access control method based on the access interface described above, the resources associated with cryptographic operation (such as the derived key used for encryption) can be isolated from other subsystems, such as the REE subsystem and the TEE subsystem, with lower security, which can ensure the normal implementation of application functions while controlling access to resources to avoid resource leakage during the use of the derived key.

Figure 6:
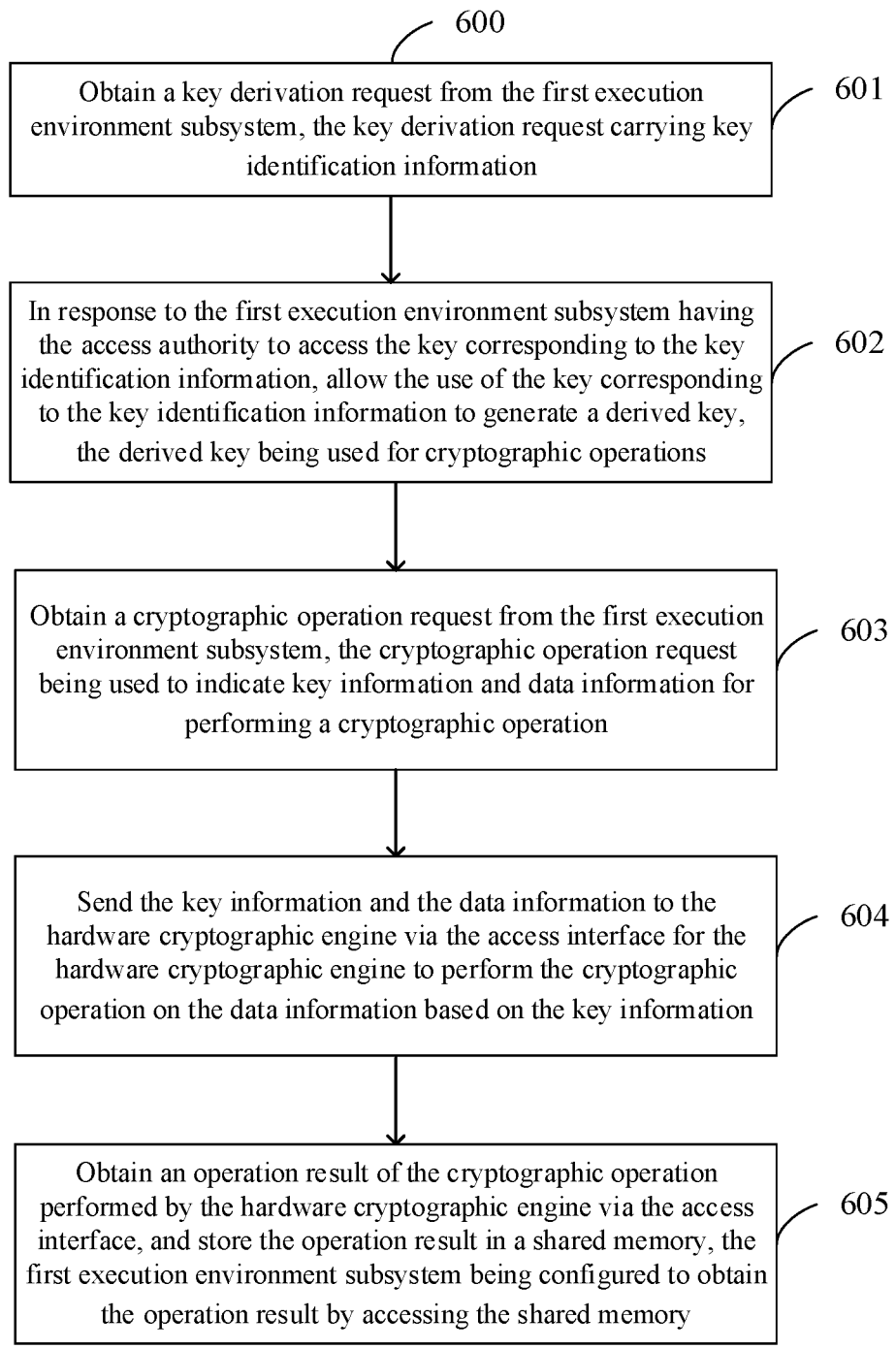
FIG. 6 is another flowchart of the key management method according to some embodiments of the present disclosure.

FIG. 6 is another flowchart of a key management method 600 according to some embodiments of the present disclosure. In FIG. 6, for the description of the processes at 601 and 602, reference can be made to the processes at 401 and 402 described above in conjunction with FIG. 4, which will not be repeated here. Next, the processes at 603 to 605 will be described in detail below.

603, obtaining a cryptographic operation request from the first execution environment subsystem, the cryptographic operation request indicating key information and data information for performing a cryptographic operation.

Take the TEE subsystem as an example of the first execution environment subsystem. First, the TEE subsystem may send a cryptographic operation request to the SE subsystem. The cryptographic operation request may carry key-related information and related information of the data that needs to be encrypted and decrypted. The key-related information may be the key identifier stored in the SE subsystem, the parameters used for key derivation, etc. In addition, the cryptographic operation request may directly carry the to-be-encrypted data, or may also carry parameters such as the address and size of the data block.

For example, when the key-related information is the key identifier, the key identifier may be indicated the derived key generated in the process at 602. That is, the cryptographic operation request may indicate that a cryptographic operation is to be performed based on the derived key. In this case, the SE subsystem may also perform authentication based on the access rules or the sub-access rules managed in association with the derived key to determine whether the TEE subsystem has the authority to perform the cryptographic operation based on the derived key.

In another example, when the key-related information is a parameter used for key derivation, the SE subsystem may generate a new derived key based on the parameter carried in the key derivation request for the next cryptographic operation. That is, in this case, the key used for the cryptographic operation may not be the derived key generated in the process at 602, but another derived key generated based on the parameter carried in the key derivation request. For the process of generating the derived key, reference can be made to the relevant description in the foregoing embodiments, which will not be repeated here.

604, in response to the key derivation request, sending the key information and the data information to the hardware cryptographic engine via the access interface for the hardware cryptographic engine to perform the cryptographic operation on the data information based on the key information. The cryptographic operation performed by the hardware cryptographic engine may include encrypting data based on a derived key received via an access interface. The specific encryption algorithm may be the symmetric encryption algorithm, the asymmetric encryption algorithm, the hash algorithm, etc. described above, which is not limited in the embodiments of the present disclosure.

After the hardware cryptographic engine performs the cryptographic operation on the data information based on the key information, the key management method according to some embodiments of the present disclosure may further include the following process:

605, obtaining an operation result of the cryptographic operation performed by the hardware cryptographic engine via the access interface, and storing the operation result in a shared memory. The first execution environment subsystem is configured to obtain the operation result by accessing the shared memory. In some embodiments, the result of the cryptographic operation may be encrypted data. In the process at 605, since the TEE subsystem does not have the access authority to directly access the hardware cryptographic engine, for the generated cryptographic operation result, the SE subsystem may need to provide the result to the requesting TEE subsystem via the shared memory.

In the key management method provided by the embodiments of the present disclosure, the access control between the subsystem and the hardware cryptographic engine can be implemented based on a specific access interface. The cryptographic operations can be performed by means of hardware to improve the encryption performance. In addition, the physical isolated based on the access interface prevents the subsystems without the access authority to directly access the cryptographic engine, but needs to request the corresponding services from the SE subsystem with the access authority. Based on the request, the access authority involved in each access process can be authenticated by the SE subsystem, such as by signature verification, to fully ensure the security of the data. Therefore, using the key management method provided by the embodiments of the present disclosure can effectively improve data security, avoid access operations with security risks, and avoid security risks such as leakage of important information. Further, improving the security of the terminal device is beneficial to enrich the application scenarios of the device. For example, programs with high security requirements can also be installed in personal mobile phones and the corresponding functions can be implemented to ensure user information security and help build a safe and reliable environment for product usage.

Figure 7:
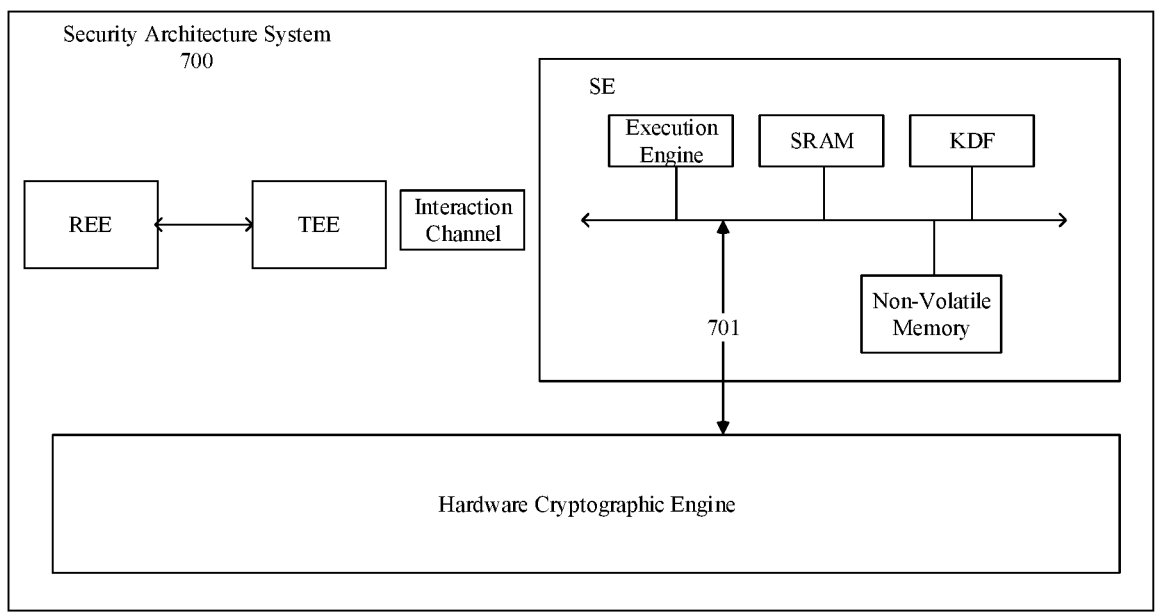
FIG. 7 is another schematic block diagram of the security architecture system according to some embodiments of the present disclosure.

FIG. 7 is a schematic block diagram of a security architecture system 700 according to some embodiments of the present disclosure. Compared with the security architecture system 500 shown in FIG. 5, the security architecture system 700 shown in FIG. 7 further includes a hardware cryptographic engine and an access interface 701 between the hardware cryptographic engine and the SE subsystem. Through the access interface 701, the SE subsystem may perform data transmission with the hardware cryptographic engine to instruct the hardware cryptographic engine to perform corresponding cryptographic operations. In contrast, the TEE subsystem and the REE subsystem in the security architecture system do not have the access authority to access the hardware cryptographic engine. When the TEE subsystem and the REE subsystem require cryptographic operations, the hardware cryptographic engine may be controlled to perform the corresponding processing by requesting the SE subsystem with the access authority.

First, the TEE subsystem may send a cryptographic operation request to the SE subsystem via the interaction channel, and the cryptographic operation request may carry the key-related information and the related information of the data to be encrypted and decrypted. The key-related information may be the key identifier stored in the SE subsystem, the parameters used for key derivation, etc. The key derivation request may directly carry the to-be-encrypted data, or may also carry parameters such as the address and size of the data block.

According to some embodiments of the present disclosure, after receiving the cryptographic operation request from the TEE subsystem, the SE subsystem may also be configured to determine the key-related information. If the key identifier is carried in the request, whether the requesting party (i.e., the TEE) has the authority to use the key may be determined (such as by verifying the certificate, etc.). In response to the TEE subsystem having the access authority, the key may be transmitted to the cryptographic engine via the access interface 701. In response to the TEE not having the access authority, transmitting the key to the cryptographic engine may be denied.

The key authentication process implemented by the SE subsystem describe above can further ensure the security of the root key requested for performing cryptographic operations, and prevent the TEE subsystem without the access authority from performing the corresponding unauthorized operations based on the root key, which reduces the system security.

In addition, if the cryptographic operation request carries the parameters for key derivation (e.g., the identity of the root key, the length of the derived key, the rounds of the derived key, etc.), the SE subsystem may use the KDF to perform the key derivation process based on the parameters of the key derivation, and send the generated derived key and data information to the hardware cryptographic engine for operation. Further, the SE subsystem may also authenticate the root key in the parameters used for key derivation similarly as described above, to determine whether the requester TEE subsystem has the authority to use the root key for key derivation, thereby ensuring the security of the root key and its derived keys.

In the above embodiment, the hardware cryptographic engine may only be accessed by the SE subsystem, while the REE subsystem and the TEE subsystem may only request the SE subsystem to provide the corresponding cryptographic operation service. Since the SE subsystem's firmware is relatively small and is generally developed and provided by chip manufacturers, its risk of security vulnerabilities is extremely low compared to the TEE subsystem or the REE subsystem. Therefore, the security architecture system in the above embodiment can effectively protect the security of resources such as root keys.

For the use process of the derived key generated according to some embodiments of the present disclosure (e.g., performing cryptographic operation), since only the SE subsystem has the access interface to the hardware cryptographic engine and neither the TEE subsystem or the REE subsystem has the corresponding access interface, the derived key used for the cryptographic operation may also not be in contact with the TEE subsystem and the REE subsystem. That is, the TEE subsystem and the REE subsystem may not directly use the generated derived key, but need to request the SE subsystem to implement the corresponding operations. In addition, the requester may be authenticated before the key is derived or the generated derived key is used, which further ensures the security of the derived key and reduces the leakage risk of the derived key.

Further, after the hardware cryptographic engine performs the corresponding cryptographic operation, the SE subsystem may also obtain the operation result of the cryptographic operation performed by the hardware cryptographic engine via the access interface 701, and store the operation result in the shared memory. The TEE subsystem may obtain the operation result by accessing the shared memory. That is, for the operation result, since the TEE subsystem does not have the access authority to the hardware cryptographic engine, the SE may provide the operation result generated by the SE subsystem to the TEE subsystem via the shared memory.

Figure 8:
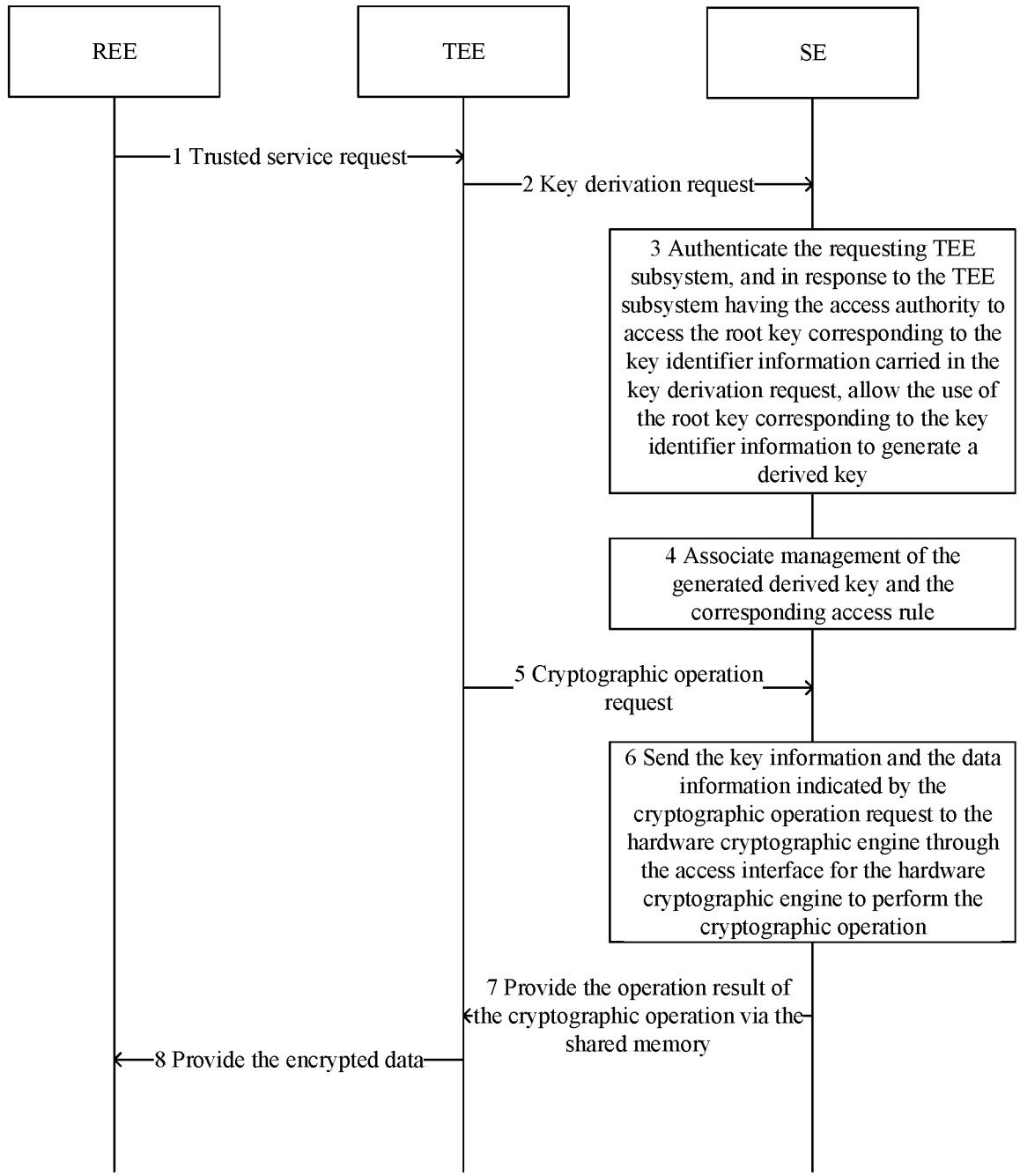
FIG. 8 is an interactive flowchart of the key management method according to some embodiments of the present disclosure.

FIG. 8 is an interactive flowchart of the key management method according to some embodiments of the present disclosure. In the example shown in FIG. 8, for the structure of the subsystems of the security architecture system, reference can be made to the relevant description in FIG. 7, where only the SE subsystem has the access interface 701 for accessing the hardware cryptographic engine.

As shown in FIG. 8, in the process at 1, the REE subsystem sends a trusted service request to the TEE subsystem. For example, in an application scenario involving data verification, the trusted service request may be sent by the REE subsystem to the TEE subsystem, such that the business process can move to the TEE subsystem. Next, in the processor at 2, when the TEE subsystem needs to perform key derivation, the TEE subsystem may send a key derivation request to the SE subsystem. In the process at 3, in response to the key derivation request, the SE subsystem may authenticate the requesting party (i.e., the TEE subsystem). If the TEE subsystem has the access authority to the root key corresponding to the key identifier information carried in the key derivation request, the SE can allow the use of the root key corresponding to the key identifier information to generate a derived key. In addition, the key derivation request may also carry the access rules for the generated derived key. Therefore, in the process at 4, the SE subsystem may associate the generated derived key and the corresponding access rule. In some embodiments, the associated management may refer to storing the derived key and the corresponding access rule as a data block, or the associated management may refer to assigning a corresponding index to the derived key and the corresponding access rule, which is not limited in the embodiments of the present disclosure.

For the generated derived key, the SE subsystem may perform the corresponding operation based on the instruction of the requesting TEE, such as performing an authentication operation. For example, based on specific requirements, if the probability of subsequent use of the derived key is low, the derived key may be directly discarded after the authentication operation. That is, the derived key may not be stored, which saves the storage space in the SE subsystem. In another example, based on specific requirements, if the probability of subsequent use of the derived key is high, the derived key may be stored in the memory of the SE subsystem after the authentication operation. In addition, in this case, the TEE subsystem may also indicate the access rule corresponding to the derived key to the SE subsystem in the key derivation request or other requests. Accordingly, the SE can manage the derived key and its corresponding access rules in an associated manner, such that other requesters (such as the REE subsystem, the TEE subsystem, or the SE subsystem) may be authenticated based on the access rules before using the derived key.

Next, when the TEE subsystem needs to perform a cryptographic operation, a cryptographic operation request may be sent to the SE subsystem (the process at 5). In response to the cryptographic operation request, the SE subsystem may first authentication the key information carried in the request. Then, in the process at 6, the SE subsystem may send the key information and data information indicated by the cryptographic operation request to the hardware cryptographic engine via the access interface 701 for the hardware cryptographic engine to perform the cryptographic operation.

Next, in the process at 7, the SE subsystem may provide the result of the cryptographic operation to the TEE subsystem via the shared memory, that is, the TEE subsystem may obtain the result of the cryptographic operation from the shared memory. Next, in the process at 8, the TEE subsystem may provide the obtained operation result (e.g., the encrypted data) to the REE subsystem.

By using the key management method provided by the embodiments of the present disclosure, the security of the resources stored in the SE subsystem can be improved, and the risk of leakage of important information such as the root key can be reduced. More specifically, in the key management method provided by the embodiments of the present disclosure, for the key stored in the SE subsystem, the key may be derived based on a key. The derived key may be used in processes such as cryptographic operations to ensure the security of the stored key, avoid the risk of leakage of important resource, and further improve the security performance of the security architecture system.

In the key management method provided by the embodiments of the present disclosure, the key stored in the SE subsystem itself may not be directly used in a specific process. Instead, a derived key may be used to replace the key stored in the SE subsystem for use and management, thereby ensuring the security of important resources such as the root key, and further reducing the risk of the stored key being compromised. For example, for the same batch or even the same series of chips, the root key may be the same, and the frequent use of the root key makes it vulnerable to leakage (such as during a physical attack). If the root key is leaked, the same batch or series of products can have security risks. Embodiments of the present disclosure propose the use of the derived key instead of the root key for processes. In the case where the derived key is leaked during use, the scope of security impact can be limited to a certain application or scenario. In addition, a new derived key can be generated based on the root key. Accordingly, the leakage of the derived key does not affect the security of the entire system, thereby ensuring the security and stability of the security architecture system.

In addition, in some embodiments, the hardware cryptographic engine may only be accessed by the SE subsystem, while neither the REE subsystem nor the TEE subsystem have the access authority to access the cryptographic operation service. Therefore, in the case that the derived key needs to be used for cryptographic operations, the TEE subsystem or the REE subsystem needs to request the SE subsystem to provide the corresponding cryptographic operation service, thereby further ensuring the security of the derived key during use. In the security architecture system provided by the embodiments of the present disclosure, the security of important resources such as the root key and the derived key generated based on the root key can be effectively protected, and the security level of the system can be improved.

Figure 9:
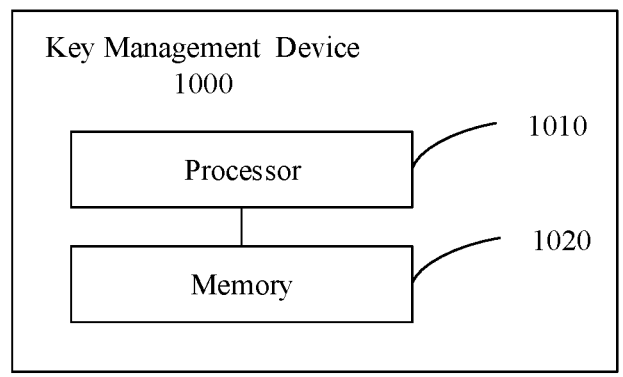
FIG. 9 is a schematic block diagram of a key management device according to some embodiments of the present disclosure.

Another aspect of the present disclosure further provides key management device. FIG. 9 is a schematic block diagram of a key management device 1000 according to some embodiments of the present disclosure.

As shown in FIG. 9, the key management device 1000 according to some embodiments of the present disclosure includes a processor 1010 and a memory 1020. More specifically, the key management device 1000 according to some embodiments of the present disclosure may be configured with the security architecture system described above. The security architecture system may include a first execution environment subsystem and a secure element subsystem. The secure element subsystem may be used to store the key in the memory 1020, and there may be a hardware isolation mechanism between the secure element subsystem and the first execution environment subsystem.

According to some embodiments of the present disclosure, the processor 1010 may be configured to obtain the key derivation request from the first execution environment subsystem, the key derivation request carrying key identifier information; and, in response to the first execution environment subsystem having the access authority to access the key corresponding to the key identifier information, allow the use of the key corresponding to the key identifier information to generate a derived key. The derived key is used to perform cryptographic operations.

According to some embodiments of the present disclosure, the derived key may be associated with a derived key access rule, and the processor 1010 may be further configured to, in the case of invoking the derived key, determine whether the requester invoking the derived key has the access authority to the derived key based on the derived key access rule.

According to some embodiments of the present disclosure, the derived key access rule may include a plurality of sub-access rules, each of which may be used to indicate how the derived key is operated. In some embodiments, the processor 1010 may be further configured to receive an access request from the first execution environment subsystem. The access request is used to request an operation mode to be performed on the derived key. The processor 1010 is also configured to: in response to the access authority of the first execution environment subsystem meeting the sub-access rules set for the operation mode required by the access request, perform operations on the derived key based on the operation mode indicated by the access request.

According to some embodiments of the present disclosure, the security architecture system may further include a hardware cryptographic engine. The first execution environment subsystem may not have the access authority to access the hardware cryptographic engine. The secure element subsystem may have the access authority to access the hardware cryptographic engine, and access the hardware cryptographic engine via the access interface to perform cryptographic operations through the hardware cryptographic engine.

According to some embodiments of the present disclosure, the processor 1010 may be further configured to obtain a cryptographic operation request from the first execution environment subsystem, the cryptographic operation request indicating key information and data information for performing a cryptographic operation; and send the key information and the data information to the hardware cryptographic engine via the access interface. The hardware cryptographic engine is configured to perform the cryptographic operation on the data information based on the key information.

According to some embodiments of the present disclosure, the secure element subsystem may further include a shared memory. The processor 1010 may be configured to obtain an operation result of the cryptographic operation performed by the hardware cryptographic engine via the access interface, and store the operation result in a shared memory. The first execution environment subsystem is configured to obtain the operation result by accessing the shared memory.

For the specific form and functions of the security architecture system arranged in the key management device, reference can be made to the relevant description in the foregoing embodiments. In addition, for the processes implemented by the processor 1010, reference can be made to the key management method in the foregoing embodiments, which will not be repeated here.

The processor 1010 may be configured to perform various actions and processes according to the programs stored in the memory 1020, thereby realizing or executing various methods, processors, and logical block diagrams provided by the embodiments of the present disclosure. Specifically, the processor 1010 may be an integrated circuit chip having signal processing capabilities. The processor may be a general-purpose processor, a digital signal processor (DSP), an application specific integrated circuit (ASIC), a ready-made programmable gate array (FPGA) or other programmable logic devices, a discrete gate or a transistor logic device, and a discrete hardware component. The general-purpose processor may be a microprocessor, or the processor may also be any conventional processor, etc., and can be X86 architecture or ARM architecture, etc.

The memory 1020 can store computer executable instruction codes which are used to implement the key management method according to the embodiments of the present disclosure when executed by the processor 1010. Specifically, the memory 2020 may be a volatile memory, a nonvolatile memory, or may include both volatile memory and nonvolatile memory. Nonvolatile memory may be read-only memory (ROM), programmable read-only memory (PROM), erasable programmable read-only memory (EPROM), electrically erasable programmable read-only memory (EEPROM), or flash memory. The volatile memory may be a random-access memory (RAM), which is used as an external cache. Many forms of RAMs are available, such as static random-access memory (SRAM), dynamic random-access memory (DRAM), synchronous dynamic random-access memory (SDRAM), double data rate synchronous dynamic random-access memory (DDRSDRAM), enhanced synchronous dynamic random-access memory (ESDRAM), synchronously connected dynamic random-access memory (SLDRAM) and direct memory bus random-access memory (DR RAM). It should be noted that the memory of the method described herein is intended to include, but not be limited to, these and any other suitable types of memories.

By using the key management device provided by the embodiments of the present disclosure, the security of the resources stored in the SE subsystem can be improved, and the risk of leakage of important information such as the root key can be reduced. More specifically, in the key management device provided by the embodiments of the present disclosure, for the key stored in the SE subsystem, the key may be derived based on a key. The derived key may be used in processes such as cryptographic operations to ensure the security of the stored key, avoid the risk of leakage of important resource, and further improve the security performance of the security architecture system.

Figure 10:
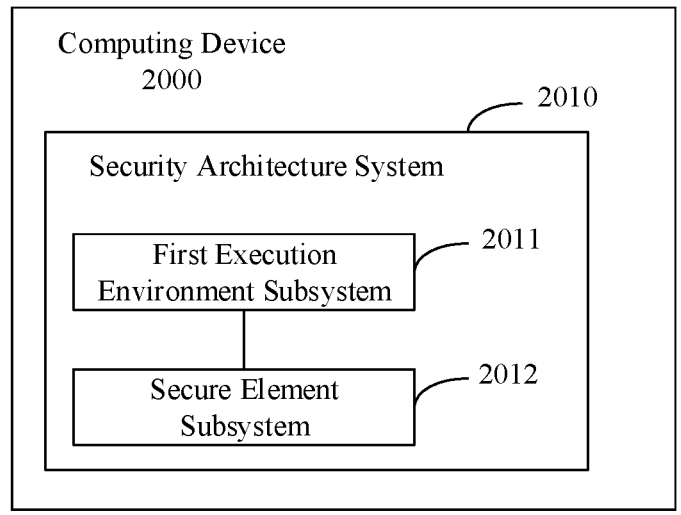
FIG. 10 is a schematic block diagram of a computing device according to some embodiments of the present disclosure.

Another aspect of the present disclosure further provides a computing device. FIG. 10 is a schematic block diagram of a computing device 2000 according to some embodiments of the present disclosure. As shown in FIG. 10, the computing device 2000 includes a security architecture system 2010, which includes a first execution environment subsystem 2011 and a secure element subsystem 2012. Keys may be stored in the secure element subsystem 2012, and there may be a hardware isolation mechanism between the secure element subsystem 2012 and the first execution environment subsystem 2011.

In some embodiments, the secure element subsystem 2012 may be configured to obtain the key derivation request from the first execution environment subsystem, the key derivation request carrying key identifier information; and, in response to the first execution environment subsystem having the access authority to access the key corresponding to the key identifier information, allow the use of the key corresponding to the key identifier information to generate a derived key. The derived key being used to perform cryptographic operations.

According to some embodiments of the present disclosure, the first execution environment subsystem may include at least one of a REE subsystem and a TEE subsystem. In some embodiments, the first execution environment subsystem may include both the REE subsystem and the TEE subsystem.

In addition, the secure element subsystem 2012 may also similarly realize other processes of the key management method provided by the embodiments of the present disclosure, which will not be repeated here.

Figure 11:
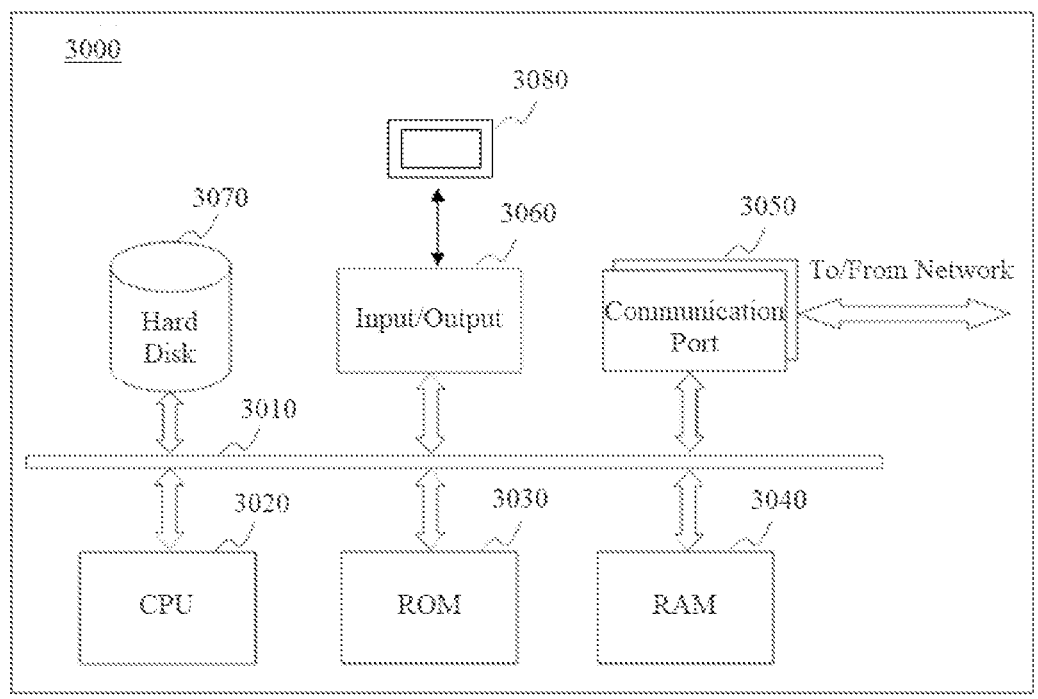
FIG. 11 is a schematic diagram of an exemplary electronic device architecture according to some embodiments of the present disclosure.

The key management method or key management device according to the embodiments of the present disclosure may also be implemented by means of the architecture of an electronic device 3000 shown in FIG. 11. As shown in FIG. 11, the computing device 3000 may include bus 3010, one or more CPUs 3020, read-only memory (ROM) 3030, random access memory (RAM) 3040, communication port 3050 connected to the network, input/output component 3060, hard disk 3070, etc. The storage device in the computing device 3000, such as ROM 3030 or hard disk 3070, may store various data or files used for processing and/or communication of the key management method provided by the present disclosure, as well as program instructions executed by the CPU. The computing device 3000 may also include a user interface 3080.

Of course, the architecture shown in FIG. 11 is only exemplary, when implementing different devices, one or more components of the computing device shown in FIG. 11 may be omitted according to system requirements. In some embodiments, the computing device 3000 described above may be implemented as a mobile terminal installed with an application program. In addition, the key management method according to the embodiments of the present disclosure may be implemented in the mobile terminal to realize the corresponding technical effects.

Those skilled in the art can understand that the content disclosed in the present disclosure can have various modifications and improvements. For example, the various devices or components described above can be implemented by hardware, or can be implemented by software, firmware, or a combination of some or all of them.

Furthermore, although the present disclosure makes various references to certain units in the system according to the embodiments of the present disclosure, any number of different units can be used and run on the client and/or server. The unit is merely illustrative and different units can be used for different aspects of the system and method.

Flowcharts are used in the present disclosure to illustrate the steps of methods provided by the embodiments of the present disclosure. It is to be expressly understood that, the preceding or following steps may or may not be implemented in exact order. Conversely, the steps may be performed in inverted order, or simultaneously. In addition, one or more other steps may be added to the flowcharts.

Those of ordinary skill in the art can understand that all or part of the steps in the above method can be completed by instructing relevant hardware through a program, and the program can be stored in a computer-readable storage medium, such as a read-only memory, a magnetic disk, or an optical disk, etc. Optionally, all or part of the steps of the foregoing embodiments can also be implemented using one or more integrated circuits. Accordingly, each module/unit in the foregoing embodiments can be implemented in the form of hardware or can be implemented in the form of software functional modules. The present disclosure is not limited to the combination of hardware and software in any particular form.

Unless defined otherwise, all terms (including technical and scientific terms) used here have the same meaning as those commonly understood by those of ordinary skill in the art to which this disclosure belongs. It should also be understood that terms such as those defined in ordinary dictionaries should be interpreted as having meanings which are consistent with their meanings in the context of the relevant technology and should not be interpreted in ideal or extremely formal meanings, unless explicitly defined as such here.

The above is an illustration of the present disclosure and should not be considered as a limitation thereof. Although several exemplary embodiments of the present disclosure are described, it will be easy for those skilled in the art to understand that many modifications can be made to the exemplary embodiments without departing from the novel teaching and advantages of the present disclosure. Therefore, all these modifications are intended to be included in the scope of the present disclosure as defined in the claims. It should be understood that the above is an illustration of the present disclosure and should not be considered as being limited to the particular embodiments disclosed, and modifications to the disclosed embodiments and other embodiments are intended to be included in the scope of the appended claims. The present disclosure is limited by the claims and their equivalents.

What is claimed is:

1. A key management method suitable for a security architecture system, the method comprising:
   obtaining, at a secure element subsystem of the security architecture system, a key derivation request from a first execution environment subsystem of the security architecture system, the key derivation request carrying key identifier information, wherein the secure element subsystem is configured to store a key, and a hardware isolation mechanism is arranged between the secure element subsystem and the first execution environment subsystem; and
   allowing, at the secure element subsystem, a derived key to be generated by using the key corresponding to the key identifier information in response to the first execution environment subsystem having an access authority to access the key corresponding to the key identifier information, the derived key being derived based on the key corresponding to the key identifier information, the derived key being used to perform a cryptographic operation, wherein:
      the derived key is associated with a derived key access rule; and
      the derived key access rule includes a plurality of sub-access rules, each sub-access rule indicating an operation mode for the derived key
   determining, based on the derived key access rule, whether a requester invoking the derived key has the access authority to the derived key when the derived key is invoked;
   receiving an access request from the first execution environment subsystem, the access request being used to request the operation mode to be performed on the derived key; and
   operating on the derived key based on the operation mode indicated by the access request in response to the access authority of the first execution environment subsystem meeting the sub-access rule set for the operation mode required to perform the access request.

2. The method of claim 1, wherein:
   the security architecture system further includes a hardware cryptographic engine, and the first execution environment subsystem does not have the access authority to access the hardware cryptographic engine; and
   the secure element subsystem has the access authority to access the hardware cryptographic engine, and is configured to access the hardware cryptographic engine via an access interface for the hardware cryptographic engine to perform the cryptographic operation.

3. The method of claim 2 further comprising:
   obtaining a cryptographic operation request from the first execution environment subsystem, the cryptographic operation request indicating key information and data information for performing the cryptographic operation; and
   sending the key information and the data information to the hardware cryptographic engine via the access interface for the hardware cryptographic engine to perform the cryptographic operation on the data information based on the key information.

4. The method of claim 3, wherein:
   the security architecture system further includes a shared memory; and
   the method further comprising:
   obtaining an operation result of the cryptographic operation performed by the hardware cryptographic engine via the access interface; and
   storing the operation result in the shared memory, wherein the operation result is obtained by the first execution environment subsystem by accessing the shared memory.

5. The method of claim 1 further comprising:
   rejecting or ignoring the key derivation request in response to the key derivation request corresponding to the first execution environment subsystem not having the access authority to access the key corresponding to the key identifier information.

6. A key management device having a memory and a processor, the device being configured with a security architecture system, the processor being configured to:
   obtain, at a secure element subsystem of the security architecture system, a key derivation request from a first execution environment subsystem of the security architecture system, the key derivation request carrying key identifier information, wherein the secure element subsystem is configured to store a key, and a hardware isolation mechanism is arranged between the secure element subsystem and the first execution environment subsystem; and
   allow, at the secure element subsystem, a derived key to be generated by using the key corresponding to the key identifier information in response to the first execution environment subsystem having an access authority to access the key corresponding to the key identifier information, the derived key being used to perform a cryptographic operation, wherein:
  the derived key is associated with a derived key access rule; and
  the derived key access rule includes a plurality of sub-access rules, each sub-access rule indicating an operation mode for the derived key;
determine, based on the derived key access rule, whether a requester invoking the derived key has the access authority to the derived key when the derived key is invoked;
receive an access request from the first execution environment subsystem, the access request being used to request the operation mode to be performed on the derived key; and
operate on the derived key based on the operation mode indicated by the access request in response to the access authority of the first execution environment subsystem meeting the sub-access rule set for the operation mode required to perform the access request.

7. The key management device of claim 6, wherein the processor is further configured to:
  reject or ignore the key derivation request in response to the key derivation request corresponding to the first execution environment subsystem not having the access authority to access the key corresponding to the key identifier information.

* * * * *